Oct. 9, 1934.  C. C. FUERST  1,976,339
AUTOMATIC SELF ERECTING FRONT CAMERA
Filed June 1, 1933  2 Sheets-Sheet 1

Inventor:
Carl C. Fuerst,
By Newton M. Pomus
Donald H. Stewart
Attorneys.

Oct. 9, 1934.　　　　C. C. FUERST　　　　1,976,339
AUTOMATIC SELF ERECTING FRONT CAMERA
Filed June 1, 1933　　　2 Sheets-Sheet 2
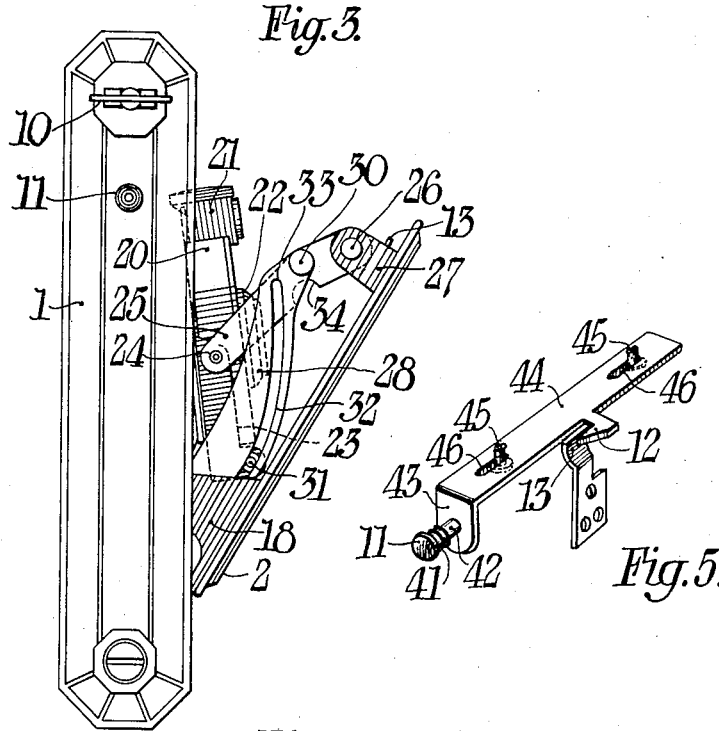
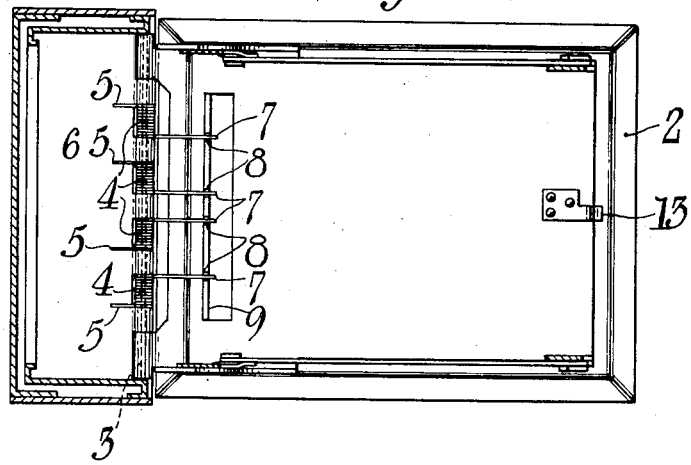
Inventor:
Carl C. Fuerst,
Newton N. Perris
By Donald H. Stewart,
Attorneys

UNITED STATES PATENT OFFICE 1,976,339

AUTOMATIC SELF-ERECTING FRONT CAMERA

Carl C. Fuerst, Rochester, N. Y., assignor to Eastman Kodak Company, Rochester, N. Y., a corporation of New York Application June 1, 1933, Serial No. 673,852

9 Claims. (Cl. 95—40)

This invention relates to photography and more particularly to photographic cameras. One object of my invention is to provide a self-erecting front camera in which the camera parts will be automatically positioned for taking an exposure by pressing a button. Another object of my invention is to provide a self-erecting front mechanism for cameras consisting of but few simple parts so arranged as to form a rigid support for the camera objective. Another object of my invention is to provide a camera with a self-erecting front mechanism actuated by the bed braces and one in which the self-erecting front mechanism can be caused to fold by pressure applied to the bed braces. Another object of my invention is to provide a self-erecting front camera in which the entire movement of the lens board to and from an erect picture taking position is definitely controlled. Another object of my invention is to provide a cam track on a part of the self-erecting front mechanism for guiding the lens board to and from an erect position. Still another object of my invention is to provide a self-erecting front mechanism which opens under the impulse of a spring mechanism arranged to act directly on the bed, and other objects will appear from the following specification, the novel features being particularly pointed out in the claims at the end thereof.

Coming now to the drawings wherein like reference characters denote like parts throughout:

Fig. 3 is a side elevation of the camera shown in Fig. 2, but with the camera in a nearly closed position.

Fig. 4 is a section on line 4—4 of Fig. 1.

Fig. 5 is an enlarged detail perspective of a preferred form of latch mechanism.

Figure 1:
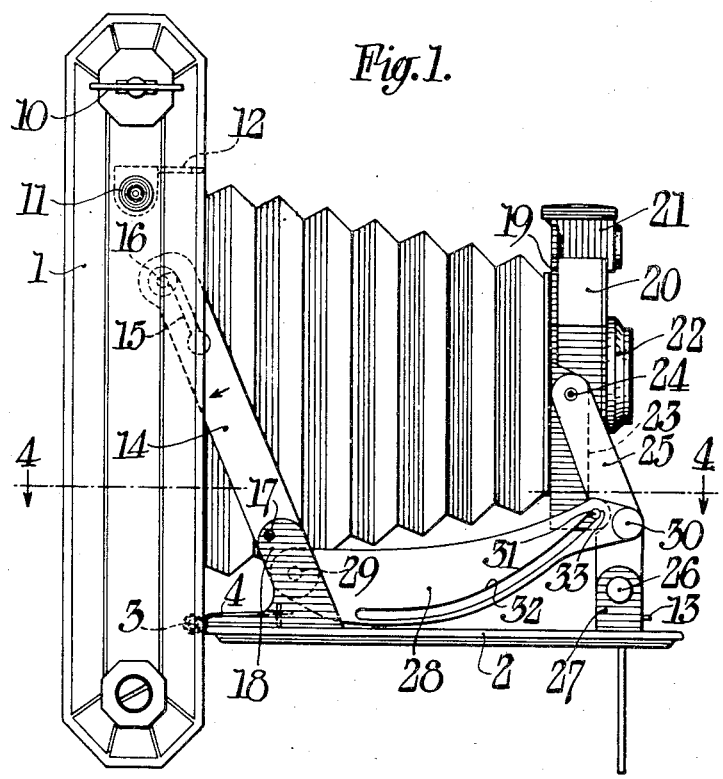
Fig. 1 is a side elevation of a camera constructed in accordance with and embodying a preferred form of my invention.

In the embodiment of my invention shown in the drawings, the camera may consist of the usual body portion 1 to which a bed 2 is hinged upon a pintle 3. This bed is normally thrust toward an open position by means of a series of springs 4, best shown in Fig. 4, each arranged to encircle the hinge pintle 3 and having one end 5 engaging an inner wall 6 of the camera body and the other end 7 engaging a notch 8 in a bracket 9.

The camera body 1 may be provided with the usual film winding key 10, release push button 11, and camera latch 12 which is adapted to engage a lug 13 carried by the camera bed 2. As indicated in Fig. 5, the push button 11 may be carried on a shaft 42 encircled by a spring 41, shaft 42 being carried by an end 43 of the latching bar 44. This bar may be mounted inside of the camera body and is provided with a pair of slots 46 adapted to slide upon studs 45. The latching member 12 is carried by the bar 44 and is normally held in engagement with the lug 13 carried by the bed 2 when the parts are in engagement by means of the spring 41. Thus, pressing in upon the push button 11 releases the interengaging latch members 12 and 13 and permits the camera bed 2 to open under the impulse of the spring 4.

The camera bed may be supported in an operative or open position by means of a pair of bed braces 14. Each of these bed braces is slotted at 15 so as to have a sliding engagement with a stud 16 carried by the camera body, and each of the braces is pivoted upon a stud 17 carried by the bracket 18 extending upwardly from the camera bed 2. When in the position shown in Fig. 1, the bed is held rigidly in an open position.

The usual lens board 19 may be provided, this member carrying a camera shutter 20 and a view finder 21. The shutter may carry a photographic objective in suitable lens cells, only one of which being illustrated as 22.

The edges of the lens board 19 are folded over into forwardly extending flanges 23 and there are pivots 24 passing through portions of these flanges 23 and through lens carriers 25. The lens carriers are pivoted upon studs 26 carried by the brackets 27 forming a part of the camera bed 2. A pair of similar parallel links 28 are pivotally attached at 29 to the bed braces 14 and are pivotally attached at 30 to the lens carriers 25.

It should be noted that the pivots 29 and 30 which connect the links 28 with the bed braces 14 and the lens carriers 25 are located on opposite sides of the pivots 17 and 26 by which the bed braces and lens carriers are mounted on the camera bed 2. Thus, when the links 14 move in one direction, the lens carriers 25 move in an opposite direction.

The flanges 23 of the lens board 19 carry a pair of studs 31 which enter the slots 32 formed in the links 28.

The slots 32 are closed slots and the edges of these slots form cams for directing the movement of the pins 31 which in effect form cam followers. When the camera is in an operative or erect position, the pins 31 fit tightly against the ends 33 of the slots 32 and hold the lens board 19 rigidly in an erect position. In order to permit the pins 31 to engage the ends 33 of the slots 28, notches 34 are cut in the lens board carriers 25.

In order to operate the camera above described, it is only necessary for an operator to press in on the push button 11. This releases the interengaging latch members 12 and 13 and permits the springs 4 to thrust the bed 2 downwardly into the position shown in Fig. 1. During this movement, the bed braces 14 through their pin and slot connections 15 and 16 slide relative to the camera body and the bed braces turn about their pivots 17. Thus, movement is transmitted to the studs 29 which thrust the links 28 away from the camera, and this movement of the links 28 turns the lens board carriers 25 in a clockwise direction (looking at Fig. 1) about their pivots 26, thus causing the lens board 19 to turn upon its pivots 24. As indicated in Fig. 3 wherein the camera is shown starting its opening movement, the pins 31 ride through the cam slots 32 and this movement is continued until, as shown in Fig. 2, the camera is in a nearly open position.

Figure 2:
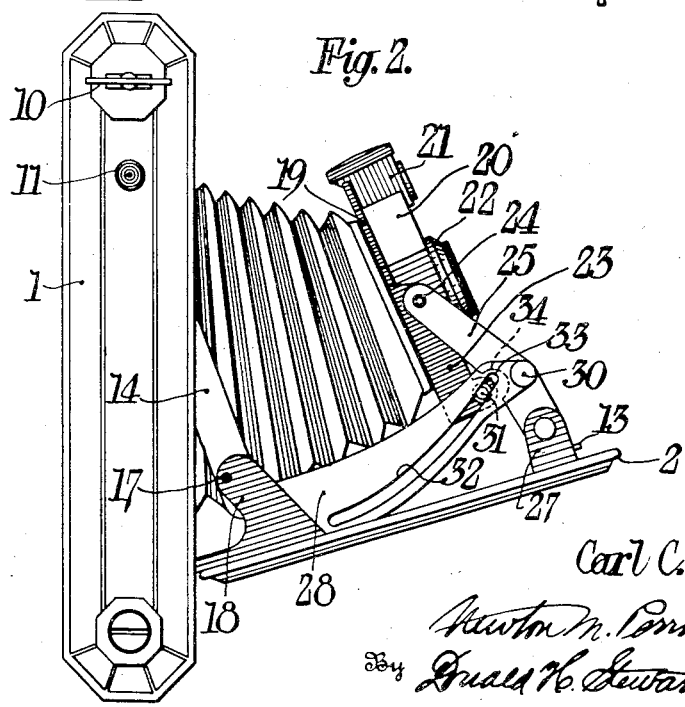
Fig. 2 is a side elevation of the camera shown in Fig. 1 on a somewhat smaller scale with the parts in a partially unfolded position.

Continuing the movement from the position shown in Fig. 2, the pins 31 reach the ends 34 of the slots 32 and the lens board 19 is brought into an operative position, as shown in Fig. 1, in which it is rigidly held parallel to the camera body.

All of this movement takes place very quickly under the impulse of the springs 4. There is, however, no great shock caused by the moving parts suddenly coming to rest when the camera is opened, because the springs 4 must cause the various parts to move to their erect position and thus much of the energy of the springs is absorbed through the opening movement.

After a picture has been taken in the usual manner, the camera can be readily closed up by merely pressing the bed braces in the direction shown by the arrow on Fig. 1. This releases the pin 16 from the end of the slot 15 and by pressing the braces 14 toward the camera body, the camera bed 2 is made to turn about its pintle 3 and against the pressure of the springs 4. Continued pressure may be applied to the camera bed until the latching elements 12 and 13 are brought into engagement. This will hold the camera in a closed position.

While I have described a preferred embodiment of my invention, other embodiments may be worked out without departing from the spirit of my invention, and I claim as within the scope of my invention all such modifications as may come within the terms of the appended claims.

What I claim is:

1. In a self-erecting front camera, the combination with a camera body, of a bed hingedly attached thereto, a bed brace for holding the bed in an operative position, a hingedly mounted lens board carrier, a link pivotally attached to the bed brace and lens board carrier, a lens board pivotally attached to the lens board carrier, and means carried by said link for guiding the lens board to and from an operative erect position.

2. In a self-erecting front camera, the combination with a camera body, of a bed hingedly attached thereto, a bed brace for holding the bed in an operative position, a hingedly mounted lens board carrier, a link pivotally attached to the bed brace and lens board carrier, a lens board pivotally attached to the lens board carrier, and means carried by said link comprising relatively slidable interengaging parts for guiding the lens board between an open and a closed position.

3. In a self-erecting front camera, the combination with a camera body, of a bed hingedly attached thereto, a bed brace for holding the bed in an operative position, a hingedly mounted lens board carrier, a slotted link pivotally attached to the bed brace and lens board carrier, a lens board pivotally attached to the lens board carrier, and means carried by said link comprising a pin on the lens board entering a slot in said link for guiding said lens board to and from an erect position.

4. In a self-erecting front camera, the combination with a camera body, of a bed hingedly attached thereto, a bed brace for holding the bed in an operative position, a hingedly mounted lens board carrier, a slotted link pivotally attached to the bed brace and lens board carrier, said slot terminating near each pivotal support and having closed ends, a lens board pivotally attached to the lens board carrier, and means carried by said link comprising a pin on the lens board entering a slot in said link for guiding said lens board to and from an erect position, the end of said slot nearest said lens board carrier also locating the lens board in an erect position.

5. In a self-erecting front camera, the combination with a camera body, of a bed hingedly attached to the body, bed braces for holding the bed in an operative position, a hingedly mounted lens board carrier, a link pivoted to both the lens board carrier and the bed brace, a lens board pivotally attached to the carrier and a pin and slot connection between a portion of the lens board and link for guiding the lens board through a path when the camera bed is moved relative to the body.

6. In a self-erecting front camera, the combination with a camera body, of a bed hingedly attached to the body, a bed brace for holding the bed in an operative position, a hingedly mounted lens board carrier, a link pivoted to both the lens board carrier and the bed brace, a lens board pivotally attached to the carrier and a pin and slot connection between a portion of the lens board and link, and a spring connected to the bed and body and adapted to exert an opening torque upon said bed, and through said bed to said self-erecting front mechanism.

7. In a self-erecting front mechanism for cameras, the combination with a camera body and bed, of a bed brace and lens board carrier each pivotally attached to the bed, the former having a slidable engagement with the camera body, a link pivotally attached to the bed brace at one end and to the lens board carrier at the other end, the two pivotal connections being on opposite sides of the two pivots supporting the bed brace and lens board carrier whereby movement of the bed brace and carrier about their pivotal connections with the bed may be in opposite directions, a lens board supported by the lens board carrier, and a pin and slot connection between the lens board and link for positively guiding the former throughout its range of movement, said pin being positioned to frictionally engage an end of the slot and to be tightly pressed thereagainst by said self-erecting front mechanism when said camera bed is moved to an open position relative to said camera body.

8. In a self-erecting front camera, the combination with a camera body, of a bed hingedly attached thereto, bed braces pivoted to the bed and having a sliding engagement with the camera body, a lens carrier pivotally attached to the bed and to the lens board, a link connecting the bed brace and lens carrier, said link being pivotally attached to each of these members on studs located on opposite sides of the pivotal mounts carried by the bed for the bed braces and lens carrier whereby said bed brace and lens carrier may turn in reverse direction upon their pivots as said bed moves relative to said body upon said hinge, and a cam and cam follower in constant engagement and carried by said link and said lens board adapted to guide the latter as it is moved by moving the camera bed relative to the body.

9. In a self-erecting front camera, the combination with a camera body, of a bed hingedly attached thereto, bed braces pivoted to the bed and having a sliding engagement with the camera body, a lens carrier pivotally attached to the bed and to the lens board, a link connecting the bed brace and lens carrier, said link being pivotally attached to each of these members on studs located on opposite sides of the pivotal mounts carried by the bed for the bed braces and lens carrier whereby said bed brace and lens carrier may turn in reverse direction upon their pivots as said bed moved relative to said body upon said hinge, said cam and follower consisting of a pin and a closed slot, both sides of said slot being adapted to be engaged by a pin whereby the path of movement of the lens board is accurately controlled throughout its entire range of movement.

CARL C. FUERST.